(12) United States Patent
Miyake et al.

(10) Patent No.: US 7,614,736 B2
(45) Date of Patent: Nov. 10, 2009

(54) PRINTING APPARATUS

(75) Inventors: Hideyuki Miyake, Kyoto (JP);
Mitsutoshi Ikawa, Yamatokoriyama (JP); Kenichi Shiraishi, Nara (JP);
Ryoichi Kawai, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 112 days.

(21) Appl. No.: 10/581,864

(22) PCT Filed: Dec. 17, 2004

(86) PCT No.: PCT/JP2004/018940

§ 371 (c)(1),
(2), (4) Date: Jun. 5, 2006

(87) PCT Pub. No.: WO2005/060232

PCT Pub. Date: Jun. 30, 2005

(65) Prior Publication Data

US 2007/0159503 A1 Jul. 12, 2007

(30) Foreign Application Priority Data

Dec. 19, 2003 (JP) .............................. 2003-422963

(51) Int. Cl.
*B41J 2/01* (2006.01)
(52) U.S. Cl. ............................ 347/104; 347/101; 347/5
(58) Field of Classification Search ................. 347/104, 347/101
See application file for complete search history.

(56) References Cited

U.S. PATENT DOCUMENTS

| | | | | |
|---|---|---|---|---|
| 6,257,692 B1* | 7/2001 | Yokoi et al. | ................. | 347/104 |
| 6,328,394 B1* | 12/2001 | Shirai et al. | ................. | 347/104 |
| 7,246,957 B2* | 7/2007 | Ouchi | ........................ | 347/104 |
| 2004/0017459 A1* | 1/2004 | Kawaguchi et al. | ......... | 347/104 |

FOREIGN PATENT DOCUMENTS

| | | |
|---|---|---|
| JP | 5-61546 U | 8/1993 |
| JP | 5-201568 A | 8/1993 |
| JP | 5-294525 A | 11/1993 |
| JP | 8-139855 A | 5/1996 |
| JP | 11-310352 A | 11/1999 |
| JP | 2002-37482 A | 2/2002 |

* cited by examiner

*Primary Examiner*—Manish S Shah
(74) *Attorney, Agent, or Firm*—Birch, Stewart, Kolasch and Birch, LLP

(57) ABSTRACT

A low cost printing device where a document sheet and a recording paper sheet are transferred by a single drive motor. A facsimile device as a printing device with an inkjet printer section has a single drive motor for producing a driving force for transferring a document sheet or a recording paper sheet. Transmission means for transmitting a rotational force of drive motor is switched by controlling the movement of an ink carriage. This enables the single drive motor to alternatively transfer a document sheet or a recording paper sheet.

6 Claims, 8 Drawing Sheets

PRINTING APPARATUS

BACKGROUND OF THE INVENTION

1. Field of the Invention

The present invention relates to a printing apparatus provided with a serial printer section.

2. Description of the Related Art

FIG. 8 is a side view illustrating a sheet conveying mechanism of a prior-art facsimile apparatus. The facsimile apparatus, which is an example of a printing apparatus, is provided with a recording sheet feeding roller 1 and a main conveying roller 2 that convey a recording sheet in order to carry out printing thereon in the case where the facsimile apparatus receives image data transmitted thereto. On the other hand, in the case of transmission of a document, a document feeding roller 3, a document rear side roller 4 and a document discharging roller (not illustrated) that are placed in the facsimile apparatus are driven to convey the document.

A recording sheet is fed by transmitting a rotation force of a reception motor 5 to the recording sheet feeding roller 1 and the main conveying roller 2, and printing onto a recording sheet is performed by a recording head placed on an ink carriage 6. At the time of transmission of a document, the document is conveyed by transmitting a rotation force of a transmission motor 7 to the document feeding roller 3, the document rear side roller 4 and the document discharging roller.

In the case of transmission of image data of a document, a driving system for reading that is not illustrated is caused to operate by the transmission motor 7, and a plurality of loaded documents are fed one by one separated by the document feeding roller 3 and separation rubber that is not illustrated. After a fed document is conveyed to the document rear side roller 4, the documents is pressed by the document rear side roller 4, and image data is read by a document reading sensor 8 while the document is being conveyed by the document rear side roller 4. The read image data is converted to digital data, encoded by data compression or the like, and transmitted. The document that the image data has been read is discharged by the document discharging roller. In a series of operations described above, image data of a document is transmitted.

On the other hand, in the case of reception and printing of an image transmitted thereto, the reception motor 5 is reversely rotated at first, a driving portion of a recording system that is not illustrated is switched, a plurality of loaded recording sheets are separated by a separating portion 9, and the recording sheet feeding roller 1 is rotated in a clockwise direction to convey a recording sheet to the main conveying roller 2. Since the fed recording sheet may skew at this moment, a front end of the recording sheet is applied to the main conveying roller 2 to make the recording sheet parallel to the main conveying roller 2, whereby the skew is corrected. At this moment, the main conveying roller 2 is reversely rotated so that the recording sheet is not conveyed by the main conveying roller 2.

Next, the reception motor 5 is normally rotated to go into a recording and printing mode. The recording sheet that the skew has been corrected is conveyed to beneath the ink carriage 6 by the main conveying roller 2. The recording sheet is conveyed to a printing position, and the ink carriage 6 is controlled to perform printing of one line. The ink carriage 6 is made to stand by in a specified position after the printing ends, and when there is a line to print next, the recording sheet is conveyed, and the ink carriage 6 is controlled to perform printing of the next line. Thus, printing onto one recording sheet is performed.

In order to print onto a next recording sheet, the reception motor 5 is reversely rotated, and the driving portion for recording sheets is switched to go into a recording sheet feeding mode. After a recording sheet is fed, the reception motor 5 is normally rotated to go into the recording sheet printing mode. Thus, two modes of controlling the reception motor 5 so as to rotate in the normal and reverse directions are used, whereby received image data is printed onto a recording sheet.

As described above, in the art illustrated in FIG. 8, reading of a document and recording and printing onto a recording sheet are performed by using different motors, but such an art is also disclosed that a solenoid is used to switch a gear and one motor is used to perform reading of a document and reception (refer to Japanese Unexamined Patent Publication JP-A 11-310352 (1999), for example).

In such an art illustrated in FIG. 8 that a reception motor is used in a recording and printing operation and a transmission motor is used in a reading operation, two motors are required, and a place for installing the motors is large. Further, in the art of JP-A 11-310352, a solenoid is necessary for switching, and the cost is high.

SUMMARY OF INVENTION

An object of the invention is to provide a low-cost printing apparatus capable of conveying documents and recording sheets by a single driving motor.

The invention provides a printing apparatus that reads a document while conveying the document and is provided with a serial printer section in which, while conveying a recording sheet, a recording head moves in a direction crossing a direction where the recording sheet is conveyed, the printing apparatus comprising:

a single driving motor that generates a driving force for conveying a document or a recording sheet;

a document conveying mechanism to which a rotation force generated by the driving motor can be transmitted to convey a document;

a recording sheet conveying mechanism that conveys a recording sheet when receiving the rotation force generated by the driving motor;

transmitting means for transmitting the rotation force generated by the driving motor to the document conveying mechanism when the recording head locates in a specified position; and controlling means for controlling movement of the recording head so that the transmitting means can transmit the rotation force generated by the driving motor to the document conveying mechanism.

According to the invention, a printing apparatus that reads a document while conveying the document and is provided with a serial printer section in which, while conveying a recording sheet, a recording head moves in a direction crossing a direction in which the recording sheet is conveyed, comprises a single driving motor that generates a driving force for conveying a document or a recording sheet. The printing apparatus further comprises a document conveying mechanism to which a rotation force generated by the driving motor can be transmitted to convey a document; a recording sheet conveying mechanism that conveys a recording sheet when receiving the rotation force generated by the driving motor; and transmitting means for transmitting the rotation force generated by the driving motor to the document conveying mechanism when the recording head locates in a specified position. By controlling movement of the recording head, it is possible to switch between a state where the transmitting means can transmit the rotation force generated by the driving motor to the document conveying mechanism and a state where the transmitting means cannot transmit the rotation force to the document conveying mechanism. At the time of transmission, it is possible to convey a document by transmitting the rotation force generated by the driving motor to the document conveying mechanism, and at the time of reception, it is possible to convey a recording sheet. Consequently, it becomes possible to alternatively convey a document and a recording sheet by the single driving motor.

Further, in the invention, the transmitting means includes a planetary gear, the document conveying mechanism includes a gear that can mesh with the planetary gear, and the planetary gear meshes with the gear provided in the document conveying mechanism when the recording head locates in the specified position.

Furthermore, in the invention, the recording sheet conveying mechanism is provided with a gear that meshes with a gear placed on the driving motor, a main conveying roller that conveys a recording sheet to beneath the recording head, and a feeding roller for conveying a recording sheet to the main conveying roller, and controlling means for controlling a rotation direction of the driving motor so as to switch between conveyance of a recording sheet by the main conveying roller and conveyance of a recording sheet by the feeding roller is provided.

Still further, in the invention, the recording head performs recording in accordance with an ink-jet method.

BRIEF DESCRIPTION OF DRAWINGS

Other and further objects, features, and advantages of the invention will be more explicit from the following detailed description taken with reference to the drawings wherein.

DETAILED DESCRIPTION OF THE INVENTION

Figure 1A:
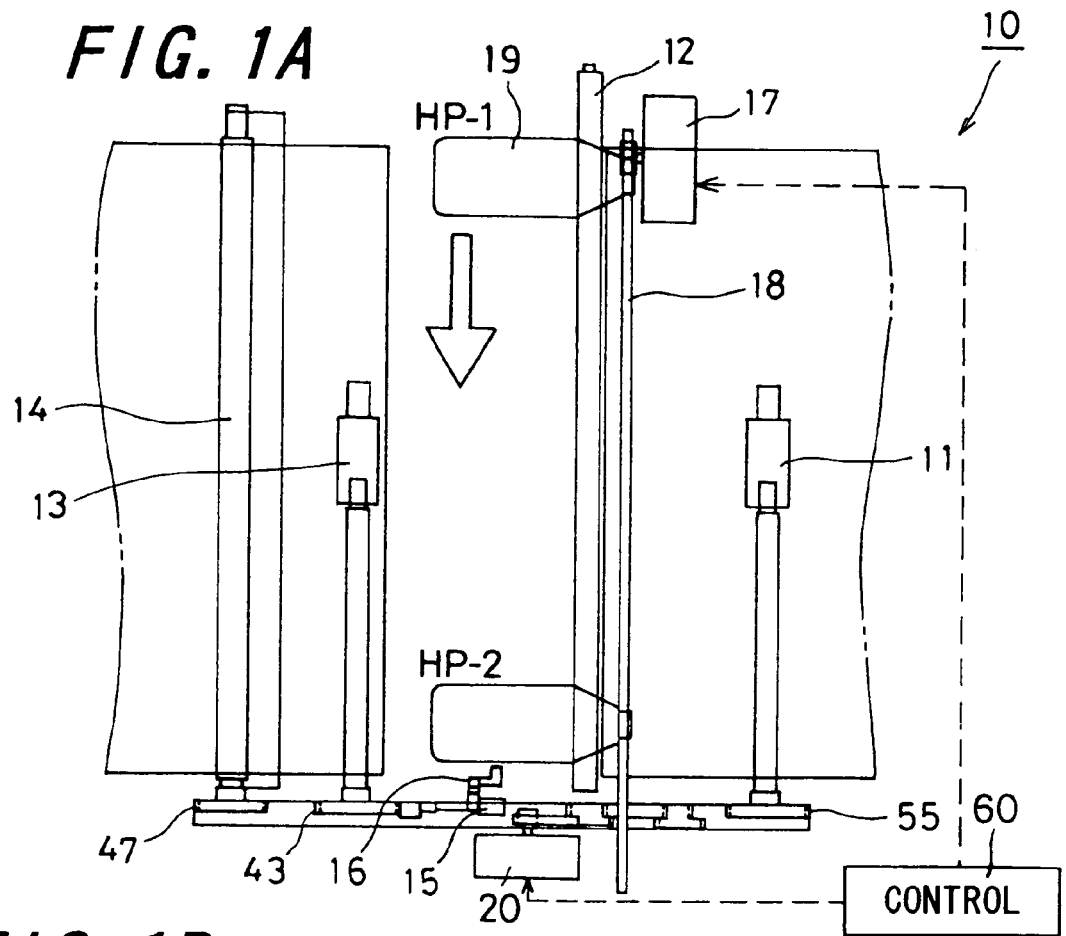
FIGS. 1A and 1B are a plan view and a side view of a facsimile apparatus provided with an ink-jet printer section according to an embodiment of the invention.

Now referring to the drawings, embodiments of the invention are described below.

Figure 1B:
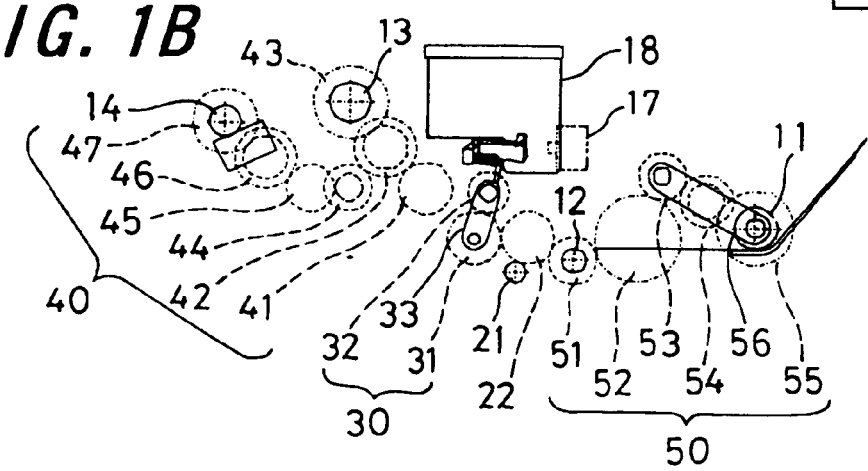
Figure 2:
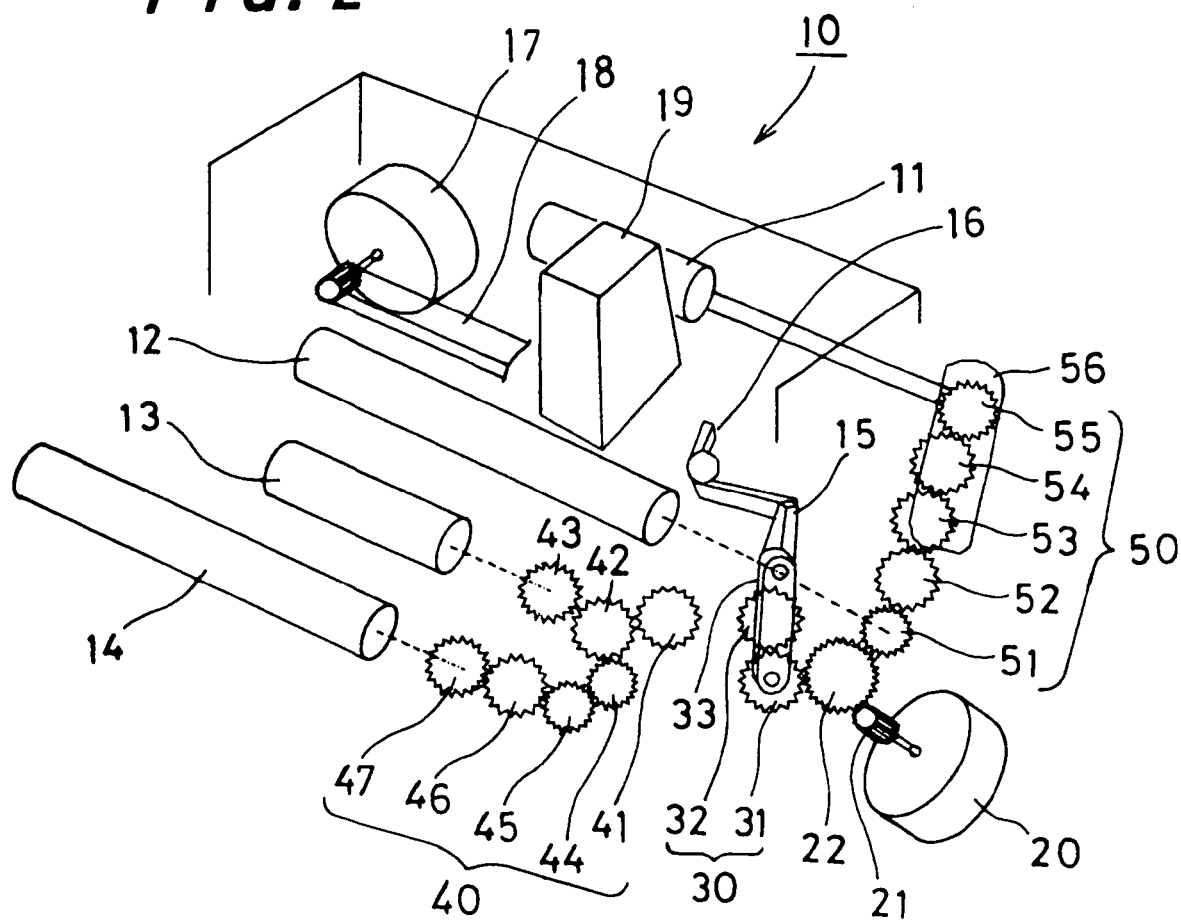
FIG. 2 is a simplified perspective view illustrating a document conveying mechanism, a recording sheet conveying mechanism and transmitting means in the facsimile apparatus of FIGS. 1A and 1B.

FIGS. 1A and 1B are a plan view and a side view of a facsimile apparatus provided with an ink-jet printer section according to an embodiment of the invention. Further, FIG. 2 is a simplified perspective view illustrating a document conveying mechanism, a recording sheet conveying mechanism and transmitting means of the facsimile apparatus provided with the ink-jet printer section according to the embodiment of the invention. A facsimile apparatus 10 that is an example of the printing apparatus is provided with a feeding roller 11 and a main conveying roller 12 both for conveying a recording sheet, and a document feeding roller 13 and a document rear side roller 14 both for conveying a document.

Figure 3A:
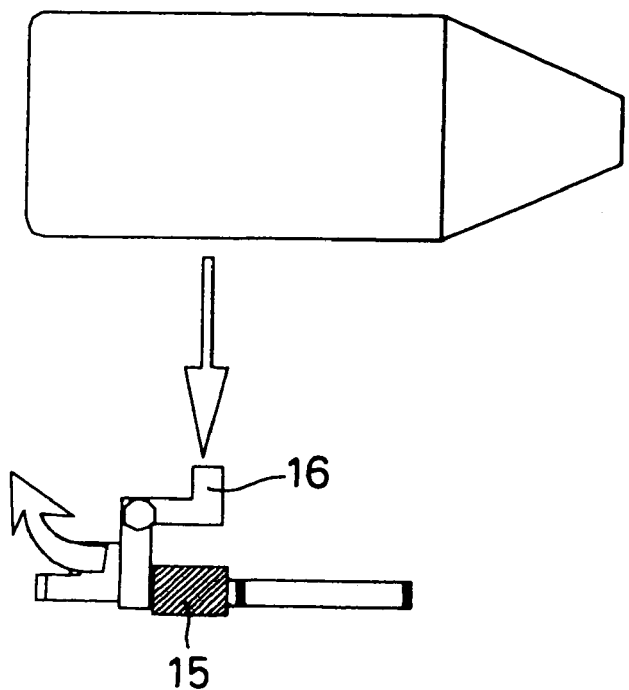
FIGS. 3A and 3B are a plan view and a side view illustrating a mooring state of a switching lever and a moored lever in the facsimile apparatus of FIGS. 1A and 1B.
Figure 3B:
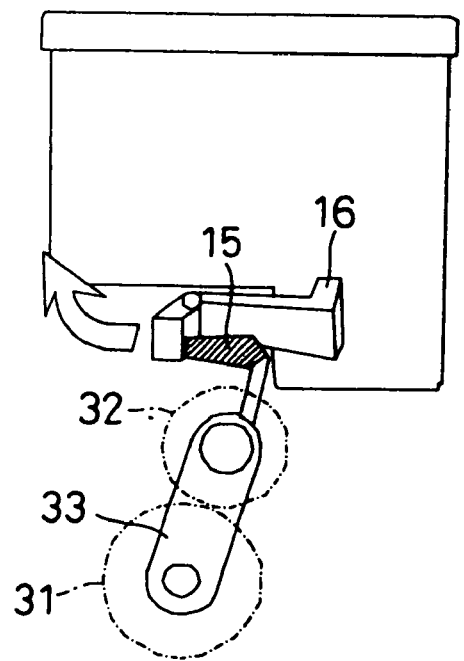

For switching between conveyance of a recording sheet and conveyance of a document, a switching lever 15 and a moored lever 16 moored to the switching lever 15 are used. This switching is done by moving an ink carriage 19 to a specified position and canceling a mooring state of the switching lever 15 and the moored lever 16 by the use of a carriage motor 17 and a timing belt 18 that transmits a rotation force of the carriage motor 17 according to an instruction by controlling means 60. Conveyance of a recording sheet is allowed by moving the ink carriage 19 to a home position 1 (referred to as a position HP-1 hereafter) and mooring the moored lever 16 to the switching lever 15, whereas conveyance of a document is allowed by moving the ink carriage 19 to a home position 2 (referred to as a position HP-2 hereafter) and canceling the mooring state of the switching lever 15 and the moored lever 16. FIGS. 3A and 3B are a plan view and a side view illustrating the mooring state of the switching lever 15 and the moored lever 16.

There is no particular limitation on location of the position HP-1 as far as it is a position in which the mooring state of the switching lever 15 and the moored lever 16 is not canceled. It is because the ink carriage 19 moves in a main operation direction when a recording and printing operation is being performed, and therefore, if the ink carriage 19 pressed the switching lever 15 during the recording and printing operation, the mooring state of the switching lever 15 and the moored lever 16 would be canceled and a document would be conveyed. From the viewpoint of simplification of a controlling device, it is desired that location of the position HP-1 be a position to check a recording head before printing when turning on the power. On the other hand, there is no particular limitation on location of the position HP-2 as far as it is a position in which the mooring state of the switching lever 15 and the moored lever 16 can be canceled, because the ink carriage 19 does not move while a document is being conveyed.

A driving motor 20 that conveys a recording sheet or a document transmits a rotation force of the driving motor to transmitting means 30 via a gear 21 placed on a shaft of the motor and a gear 22 that meshes with the gear 21. The transmitting means 30 is provided with a sun gear 31 that meshes with the gear 22, a planetary gear 32 that meshes with the sun gear, and a revolving arm 33. The sun gear 31 is disposed to a shaft member fixed to a main body of the facsimile apparatus so as to be capable of freely rotating around an axis of the shaft member. The revolving arm 33 is disposed so as to be capable of freely swinging about the axis of the shaft member at one end in a longitudinal direction of the revolving arm. The planetary gear 32 is disposed to a supporting shaft disposed to the other end in the longitudinal direction of the revolving arm 33 so as to be capable of freely rotating around an axis of the supporting shaft, in a state meshed with the sun gear 31. The switching lever 15 is connected to the other end in the longitudinal direction of the revolving arm 33. When the mooring state of the switching lever 15 and the moored lever 16 is canceled, the transmitting means 30 causes the planetary gear 32 to mesh with a document reading gear mechanism 40, and transmits a rotation force of the driving motor 20 to the document reading gear mechanism 40.

The document reading gear mechanism 40 is provided with an idle gear 41 that meshes with the planetary gear 32, a gear 42 that meshes with the idle gear 41, and a gear 43 that transmits the rotation force of the driving motor 20 to the document feeding roller 13. The document reading gear mechanism further includes a gear 44 that meshes with the gear 42, and furthermore includes a gear 45, a gear 46, and a gear 47 that is placed on a shaft of the document rear side roller 14.

Further, the driving motor 20 transmits the rotation force of the driving motor to a recording sheet feeding gear mechanism 50 via the gear 21 placed on the shaft of the motor and the gear 22 that meshes with the gear 21. The recording sheet feeding gear mechanism 50 is provided with a gear 51 that meshes with the gear 22 to drive the main conveying roller 12, an idle gear 52 that meshes with the gear 51, a sun gear 53, a middle gear 54, a planetary gear 55 that is placed on a shaft of the the feeding roller 11, and a revolving arm 56.

The sun gear 53 is disposed to a shaft member fixed to the main body of the facsimile apparatus so as to be capable of freely rotating around an axis of the shaft member. The revolving arm 56 is disposed so as to be capable of freely swinging about the axis of the shaft member at one end in a longitudinal direction of the revolving arm. The middle gear 54 is disposed to a supporting shaft disposed to a middle portion in the longitudinal direction of the revolving arm 56 so as to be capable of freely rotating around an axis of the supporting shaft, in a state meshed with the sun gear 53. The planetary gear 55 is disposed to the other end in the longitudinal direction of the revolving arm 56 so as to be capable of freely rotating around a rotation axis of the shaft of the feeding roller 11, in a state meshed with the middle gear 54.

Figure 4:
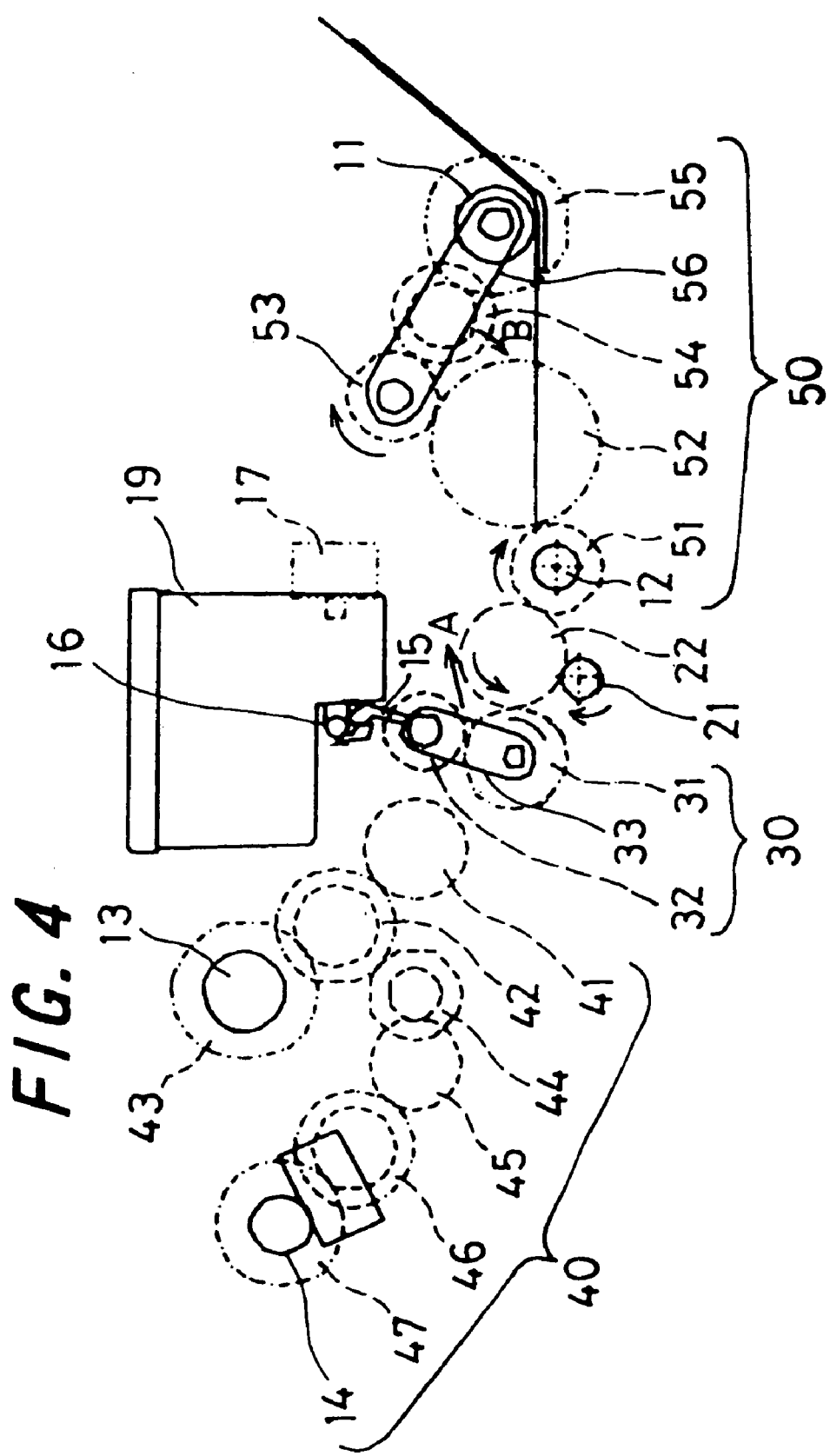
FIG. 4 is a simplified side view illustrating operations at the time of feed of a recording sheet, of a document reading gear mechanism, a recording sheet feeding gear mechanism and the transmitting means in the facsimile apparatus of FIGS. 1A and 1B.

FIG. 4 is a simplified side view illustrating operations at the time of feed of a recording sheet, of the document reading gear mechanism, the recording sheet feeding gear mechanism and the transmitting means in the facsimile apparatus provided with the ink-jet printer section according to the embodiment of the invention. According to an instruction by the controlling means 60, the driving motor 20 is reversely rotated (in a clockwise direction) to cause the revolving arm 33 and the planetary gear 32 of the transmitting means 30 to swing in a clockwise direction (a direction A in the figure). At this moment, the ink carriage 19 locates in the position HP-1 illustrated in FIG. 1A, and the moored lever 16 is moored to the switching lever 15, so that the planetary gear 32 swings in the clockwise direction (the direction A in the figure), and the rotation force of the driving motor cannot be transmitted to the document reading gear mechanism 40.

On the other hand, the rotation force of the driving motor is transmitted to the recording sheet feeding gear mechanism 50 via the gear 21 placed on the shaft of the driving motor and the gear 22. Since the driving motor 20 is rotating in the clockwise direction, the sun gear 53 of the recording sheet feeding gear mechanism 50 also rotates in the clockwise direction, and the revolving arm 56 and the planetary gear 55 swing in a clockwise direction (a direction B in the figure) about the sun gear 53. Consequently, the feeding roller 11 connected to the planetary gear 55 abuts against a recording sheet and feeds the recording sheet. At this moment, the main conveying roller 12 driven by the gear 51 rotates in a clockwise direction in which the roller cannot convey the recording sheet. Therefore, the recording sheet conveyed by the feeding roller 11 abuts against the main conveying roller 12, whereby skew of the recording sheet is corrected, and the sheet is placed in a position in which the sheet can be conveyed by the main conveying roller 12.

Figure 5:
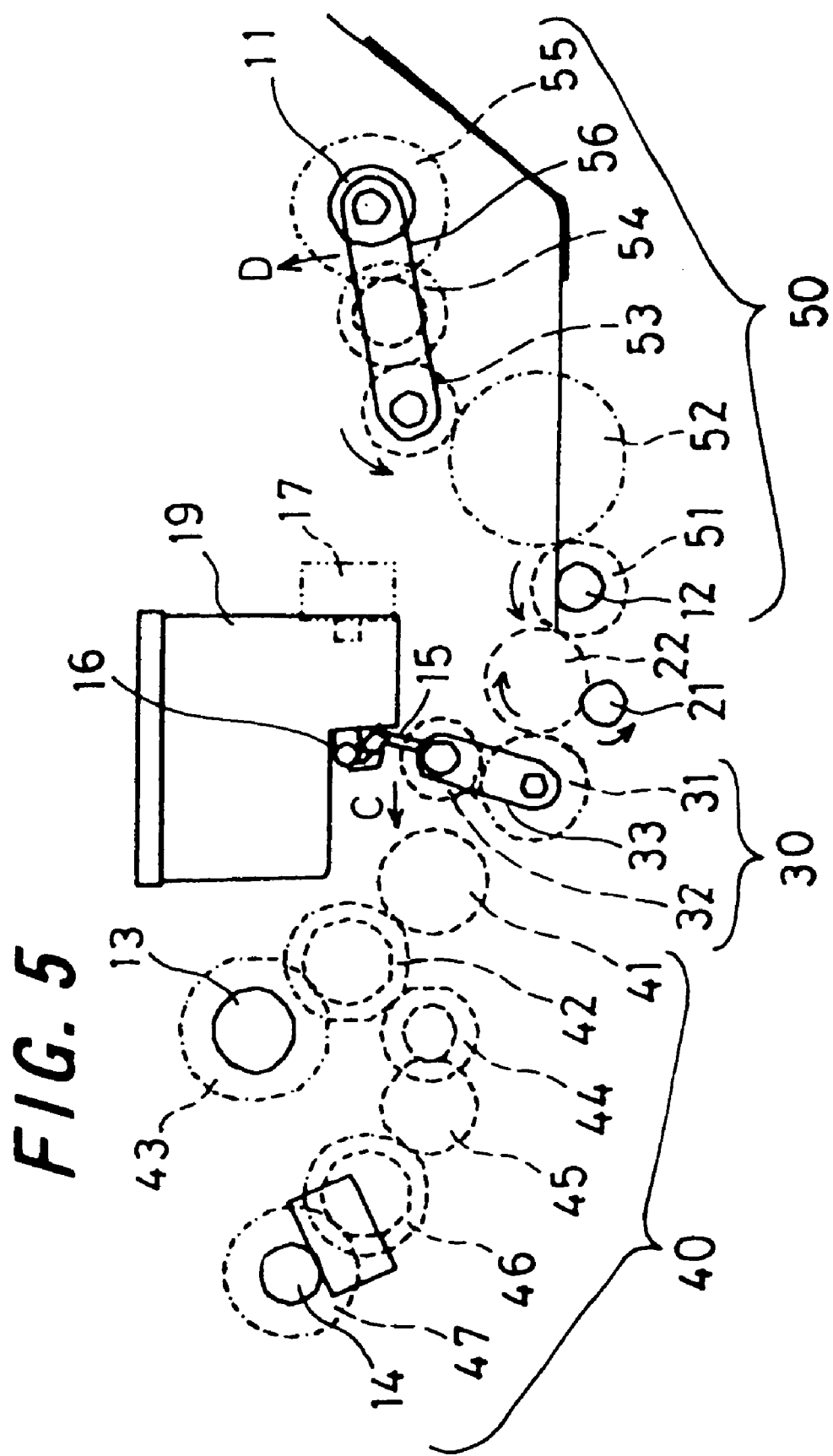
FIG. 5 is a simplified side view illustrating operations at the time of printing onto a recording sheet, of the document reading gear mechanism, the recording sheet feeding gear mechanism and the transmitting means in the facsimile apparatus of FIGS. 1A and 1B.

FIG. 5 is a simplified side view illustrating operations at the time of printing onto a recording sheet, of the document reading gear mechanism, the recording sheet feeding gear mechanism and the transmitting means in the facsimile apparatus provided with the ink-jet printer section according to the embodiment of the invention. When the driving motor is normally rotated (in a counterclockwise direction) according to an instruction by the controlling means 60, the revolving arm 33 and the planetary gear 32 are going to swing in a counterclockwise direction (a direction C in the figure) about the sun gear 31. At this moment, the ink carriage 19 locates in the position HP-1 illustrated in FIG. 1, and the moored lever 16 is moored to the switching lever 15, so that the rotation force of the driving motor is not transmitted to the document reading gear mechanism 40.

On the other hand, the rotation force of the driving motor is transmitted to the recording sheet feeding gear mechanism 50 via the gear 21 placed on the shaft of the driving motor and the gear 22. Since the driving motor is rotating in the counterclockwise direction, the sun gear 53 of the recording sheet feeding gear mechanism 50 also rotates in the counterclockwise direction, and the revolving arm 56 and the planetary gear 55 swing in a counterclockwise direction (a direction D in the figure) about the sun gear 53. Consequently, the feeding roller 11 connected to the planetary gear 55 does not abut against a recording sheet, and hence, the recording sheet is not fed. Since the main conveying roller 12 driven by the gear 51 rotates in a feeding direction at this moment, a recording sheet abutting against the main conveying roller 12 is conveyed, and image data is printed while operations of the main conveying roller 12 and the ink carriage 19 are controlled.

Figure 6:
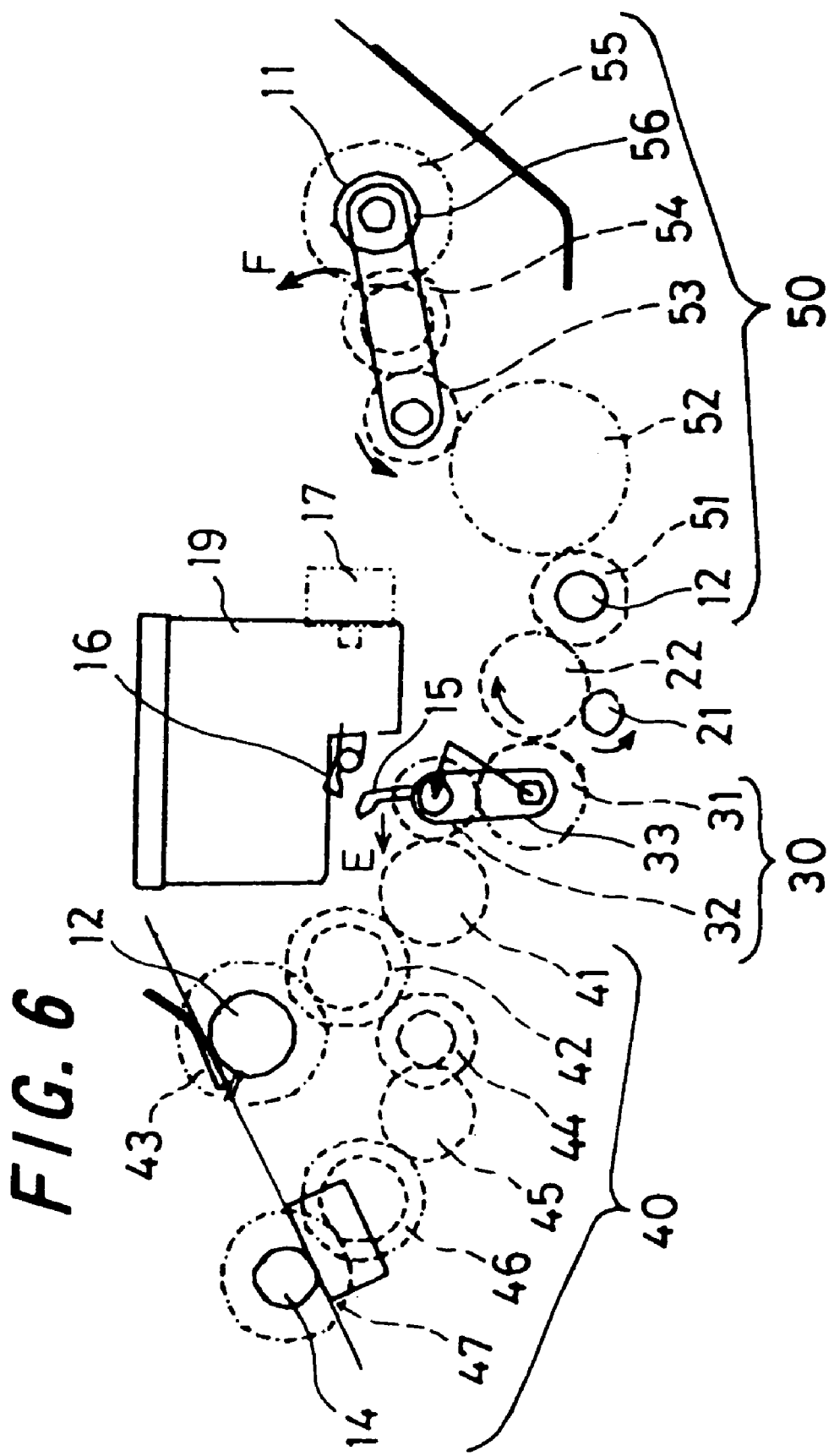
FIG. 6 is a simplified side view illustrating operations at the time of conveyance of a document, of the document reading gear mechanism, the recording sheet feeding gear mechanism and the transmitting means in the facsimile apparatus of FIGS. 1A and 1B.

FIG. 6 is a simplified side view illustrating operations at the time of conveyance of a document, of the document reading gear mechanism, the recording sheet feeding gear mechanism and the transmitting means in the facsimile apparatus provided with the ink-jet printer section according to the embodiment of the invention. According to an instruction by the controlling means 60, the carriage motor 17 is driven, and location of the ink carriage 19 is changed from the position HP-1 to the position HP-2. At this moment, the ink carriage 19 presses one end of the moored lever 16. The moored lever 16 pressed at the one end thereof rotates about a rotation fulcrum that is not illustrated, thereby canceling a state moored to the switching lever 15.

When the driving motor 20 is normally rotated (in the counterclockwise clockwise direction) according to an instruction by the controlling means 60 after the mooring state of the moored lever 16 and the switching lever 15 is canceled, the revolving arm 33 swings in a counterclockwise direction (a direction B in the figure), and the planetary gear 32 meshes with the idle gear 41 of the document reading gear mechanism 40, whereby the rotation force of the driving motor is transmitted to the idle gear 41. Rotation of the idle gear 41 is transmitted to the gear 43 placed on a shaft of the document feeding roller via the gear 42, and a document is conveyed by the document feeding roller 13. At this moment, a recording sheet is not conveyed because the planetary gear 55 of the recording sheet feeding gear mechanism 50 swings in a counterclockwise direction (a direction F in the figure). Although the document reading gear mechanism 40 and the recording sheet feeding gear mechanism 50 have such a structure that the gears are directly connected in the embodiment of the invention, the structure is not limited to the above, and may be such that the gears are connected via belts or chains.

Figure 7:
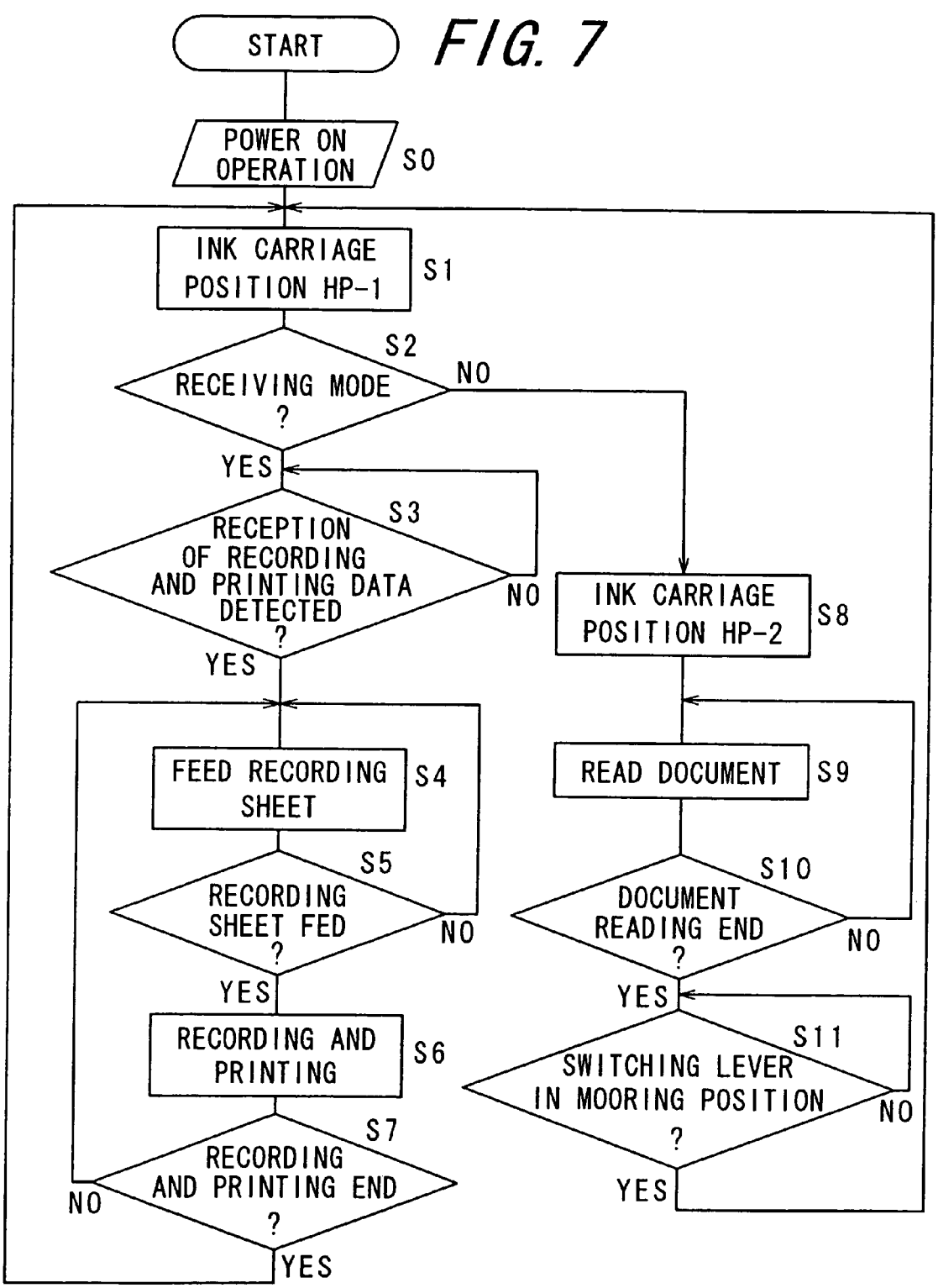
FIG. 7 is a flowchart illustrating an operation of the facsimile apparatus of FIGS. 1A and 1B.
Figure 8:
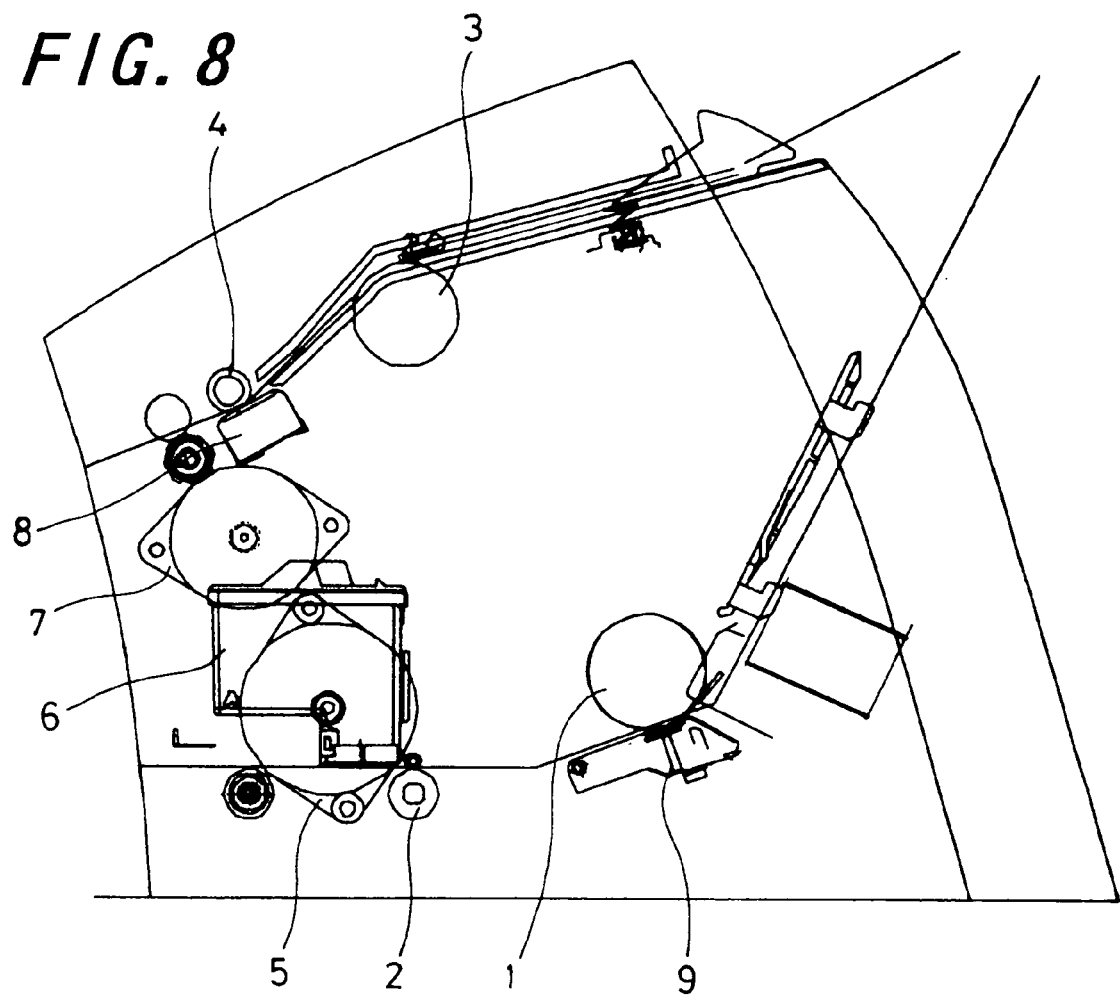
FIG. 8 is a side view illustrating the sheet conveying mechanism of the prior-art facsimile apparatus.

Next, an operation of the facsimile apparatus of the invention will be described referring to a flowchart of FIG. 7. In the operation, a mode is selected from two modes: a receiving mode and a transmitting mode. Firstly, the user of the facsimile apparatus 10 performs an operation to turn on the power at step S0. After the power is turned on, the ink carriage 19 moves to the position HP-1 at step S1. After that, it is determined at step S2 whether to select the receiving mode or the transmitting mode. When the receiving mode is selected, the operation proceeds to step S3, and reception of recording and printing data is performed. When reception of the recording and printing data is detected, the operation proceeds to step S4, where a recording sheet is fed. When the recording sheet has been fed to the main conveying roller 12, and it is determined at step S5 that feed of the recording sheet is complete, the operation proceeds to step S6, where printing onto the recording sheet is performed.

After printing onto the one recording sheet has ended, it is determined at step S7 whether all printing has ended or not. When it is determined that all the printing has not ended, the operation returns to step S4, where a recording sheet is fed again and then printing is performed. On the contrary, when it is determined that all the printing has ended, the ink carriage 19 is returned to the position HP-1 to go into a reception standby state.

On the other hand, when the transmitting mode is selected in mode selection, the ink carriage 19 is moved from the position HP-1 to the position HP-2 at step S8. When the ink carriage 19 is moved to the position HP-2, the ink carriage 19 presses the one end of the moored lever 16. Thus, the mooring state of the switching lever 15 and the moored lever 16 is canceled, and the gear 32 of the transmitting means 30 meshes with the idle gear 41 of the document reading gear mechanism 40. Consequently, conveyance of a document is allowed. At step S9, the document is read while the document is being conveyed by the document feeding roller 13 and the document rear side roller 14. After that, it is determined at step S10 whether reading of all documents has ended or not, and the operation proceeds to step S11 when it is determined that reading of all the documents has ended.

At step S11, it is determined whether the switching lever 15 has returned to a specified position or not. On the switching lever 15 and the moored lever 16, springs for pulling toward a position in which the moored lever 16 was moored to the switching lever 15 are placed. Since the driving motor 20 stops after reading of all the documents ends, the switching lever 15 returns to the mooring position by a force of the spring. On the other hand, while the ink carriage 19 is pressing the one end of the moored lever 16, movement of the moored lever 16 is restrained, so that the lever cannot return to the mooring position. However, when the ink carriage 19 moves and the moored lever 16 returns to the mooring position before the switching lever 15 returns thereto, the moored lever 16 cannot be moored to the switching lever 15. Therefore, after reading of the documents ends, there is a need to move the ink carriage 19 after confirming that the switching lever 15 has returned to the original mooring position. Accordingly, after it is confirmed at step 11 that the switching lever 15 has returned to the original position, the ink carriage 19 is returned to the position HP-1.

Although application of the invention to a facsimile apparatus provided with an ink-jet printer section is described in the above embodiment, besides, it is possible to apply to a facsimile apparatus provided with a thermal transfer printer, a sublimation thermal transfer printer or a dot impact printer as well.

Although a facsimile apparatus is illustrated as an example of the printing apparatus in the present embodiment, without limiting to a facsimile apparatus, it is possible to apply to equipment provided with a serial printer section as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, by controlling movement of the recording head, it is possible to switch between a state where the transmitting means can transmit a rotation force generated by the driving motor to the document conveying mechanism and a state where the transmitting means cannot transmit the rotation force to the document conveying mechanism. At the time of transmission, it is possible to convey a document by transmitting the rotation force generated by the driving motor to the document conveying mechanism, and at the time of reception, it is possible to convey a recording sheet. Thus, it becomes possible to alternatively convey a document and a recording sheet by a single driving motor. Consequently, it becomes possible to make a space for installing the motor small. Moreover, it is possible to reduce the cost of the printing apparatus.

Further, according to the invention, the transmitting means includes the planetary gear, the document conveying mechanism includes the gear that can mesh with the planetary gear, and the planetary gear meshes with the gear provided in the document conveying mechanism when the recording head locates in the specified position, so that it becomes possible to transmit the rotation force of the driving motor to the document conveying mechanism by simple transmitting means and controlling means, and it becomes possible to reduce the cost.

Furthermore, according to the invention, the recording sheet conveying mechanism is provided with the gear that meshes with the gear placed on the driving motor, the main conveying roller that conveys a recording sheet to beneath the recording head, and the feeding roller for conveying a recording sheet to the main conveying roller. By controlling a rotation direction of the driving motor, it is possible to alternatively switch between conveyance of a recording sheet by the main conveying roller and conveyance of a recording sheet by the feeding roller, it becomes possible to switch conveyance of a recording sheet by a simple conveying mechanism and controlling device, and it becomes possible to reduce the cost.

Still further, according to the invention, the recording head performs recording in accordance with an ink-jet method, so that it becomes possible to utilize as a printing apparatus containing an ink-jet printer section.

The invention claimed is:

1. A printing apparatus that reads a document while conveying the document and is provided with a printer section in which, while conveying a recording sheet, a printer head for printing on the recording sheet moves in a direction crossing a direction where the recording sheet is conveyed, the printing apparatus comprising:

a single driving motor that generates a rotation force;

a document conveying mechanism that conveys a document when the rotation force generated by the single driving motor is being transmitted;

a recording sheet conveying mechanism that conveys a recording sheet when the rotation force generated by the single driving motor is being transmitted;

transmitting means switchable between a first position for transmitting the rotation force generated by the driving motor to the document conveying mechanism when the printer head is located in a specified position for conveyance of the document, and a second position for transmitting the rotation force to the recording sheet conveying mechanism, without transmitting the rotation force to the document conveying mechanism, when the printer head is located in a position, for printing and conveyance of the recording sheet, other than the specified position; and controlling means for controlling movement of the printer head between the specified position and the position other than the specified position.

2. The printing apparatus of claim 1, wherein the transmitting means includes a planetary gear, the document conveying mechanism includes a gear that can mesh with the planetary gear, and the planetary gear meshes with the gear provided in the document conveying mechanism when the printer head locates in the specified position.

3. The printing apparatus of claim 1, wherein the recording sheet conveying mechanism is provided with a gear that meshes with a gear placed on the driving motor, a main conveying roller that conveys a recording sheet to beneath the printer head, and a feeding roller for conveying a recording sheet to the main conveying roller, and the printing apparatus further comprising:

controlling means for controlling a rotation direction of the driving motor so as to switch between conveyance of a recording sheet by the main conveying roller and conveyance of a recording sheet by the feeding roller.

4. The printing apparatus of claim 1, wherein the printer head performs recording in accordance with an ink-jet method.

5. A printing apparatus that reads a document while conveying the document and is provided with a printer section in which, while conveying a recording sheet, a recording head moves in a direction crossing a direction where the recording sheet is conveyed, the printing apparatus comprising:

a single driving motor that generates a rotation force;

a document conveying mechanism that conveys a document when the rotation force generated by the single driving motor is being transmitted;

a recording sheet conveying mechanism that conveys a recording sheet when the rotation force generated by the single driving motor is being transmitted;

transmitting means for transmitting the rotation force generated by the driving motor to the document conveying mechanism when the recording head is located in a specified position, and transmitting the rotation force only to the recording sheet conveying mechanism when the recording head is located in a position other than the specified position;

controlling means for controlling movement of the recording head between the specified position and the position other than the specified position;

a moored lever that makes contact with the recording head when the recording head is at the specified position; and a switching lever that engages with the moored lever when the recording head is at the position other than the specified position and disengages from the moored lever when the recording head is at the specified position, wherein the switching lever allows the transmitting means to transmit the rotation force only to the recording sheet conveying mechanism when the switching lever is in engagement with the moored lever, and allows the transmitting means to transmit the rotation force to the document conveying mechanism only when the switching lever is disengaged from the moored lever.

6. A printing apparatus that reads a document while conveying the document and is provided with a printer section in which, while conveying a recording sheet, a recording head moves in a direction crossing a direction where the recording sheet is conveyed, the printing apparatus comprising:

a single driving motor that generates a rotation force;

a document conveying mechanism that conveys a document when the rotation force generated by the single driving motor is being transmitted;

a recording sheet conveying mechanism that conveys a recording sheet when the rotation force generated by the single driving motor is being transmitted;

transmitting means for transmitting the rotation force generated by the driving motor to the document conveying mechanism when the recording head is located in a specified position, and transmitting the rotation force only to the recording sheet conveying mechanism when the recording head is located in a position other than the specified position; and controlling means for controlling movement of the recording head between the specified position and the position other than the specified position, wherein the transmitting means includes a planetary gear, the document conveying mechanism includes a gear that can mesh with the planetary gear, and the planetary gear meshes with the gear provided in the document conveying mechanism when the recording head locates in the specified position, the printing apparatus, further comprising:

a moored lever that makes contact with the recording head when the recording head is at the specified position; and a switching lever that engages with the moored lever when the recording head is at the position other than the specified position and disengages from the moored lever when the recording head is at the specified position, wherein the switching lever allows the transmitting means to transmit the rotation force only to the recording sheet conveying mechanism when the switching lever is in engagement with the moored lever, and allows the transmitting means to transmit the rotation force to the document conveying mechanism only when the switching lever is disengaged from the moored lever, wherein the transmitting means further includes a revolving arm that supports the planetary gear, and wherein the switching lever extends from the revolving arm and the planetary gear meshes with the gear provided in the document conveying mechanism when the switching lever disengages from the moored lever.

* * * * *